(12) United States Patent
Kreig et al.

(10) Patent No.: US 11,162,802 B2
(45) Date of Patent: Nov. 2, 2021

(54) SYSTEMS AND METHODS FOR CLASSIFYING VEHICLE TRIPS

(71) Applicant: Allstate Insurance Company, Northbrook, IL (US)

(72) Inventors: Alex Kreig, Northbrook, IL (US); Anthony Recchia, Chicago, IL (US); En-Chieh Yang, Chicago, IL (US); Kelly Link, Chicago, IL (US); Chhavi Tiwari, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 57 days.

(21) Appl. No.: 16/665,969

(22) Filed: Oct. 28, 2019

(65) Prior Publication Data

US 2021/0123749 A1    Apr. 29, 2021

(51) Int. Cl.
*G01C 21/34*   (2006.01)
*G06N 20/00*   (2019.01)
*G07C 5/00*    (2006.01)
*H04W 4/029*   (2018.01)

(52) U.S. Cl.
CPC .......... *G01C 21/343* (2013.01); *G06N 20/00* (2019.01); *G07C 5/008* (2013.01); *H04W 4/029* (2018.02)

(58) Field of Classification Search
CPC ........ H04W 4/029; G06N 20/00; G07C 5/008
See application file for complete search history.

(56) References Cited

U.S. PATENT DOCUMENTS

| | | |
|---|---|---|
| 6,301,533 B1 | 10/2001 | Markow |
| 7,522,069 B2 | 4/2009 | Tunnell et al. |
| 8,538,789 B1 | 9/2013 | Blank et al. |
| 8,768,734 B2 | 7/2014 | Gryan et al. |
| 9,042,908 B2 | 5/2015 | Dai et al. |
| 9,141,582 B1 | 9/2015 | Brinkmann et al. |

(Continued)

FOREIGN PATENT DOCUMENTS

JP    2016148912 A    8/2016

OTHER PUBLICATIONS

Terry Griffin et al, A Decision Tree Based Classification Model to Automate Trip Purpose Derivation, Conference Paper, Jan. 2005, Proceedings of the ISCA 18th International Conference on Computer Applications in Industry and Engineering, Nov. 9-11, 2005, Honolulu, Hawaii, USA, 6 pages.

(Continued)

*Primary Examiner* — Sisay Yacob
(74) *Attorney, Agent, or Firm* — Polsinelli PC (57) ABSTRACT

Systems and methods in accordance with embodiments of the invention can obtain and use a variety of telematics data to classify trips taken by a vehicle. Trip models can be generated based on telematics data captured during the operation of a vehicle. A variety of features of the trip model, such as the timing and/or location of stops made by the vehicle during one or more trips, can be used to classify the trip as a business trip or a personal trip. In several embodiments, machine classifiers are trained to classify features within the trip models based on historical trips that have been classified as business trips or personal trips. A number of trip models can be combined with other driver attributes to classify a particular vehicle and/or driver as engaged with a transportation network company.

20 Claims, 4 Drawing Sheets

(56) References Cited

U.S. PATENT DOCUMENTS

| | | |
|---|---|---|
| 9,141,995 B1 | 9/2015 | Brinkmann et al. |
| 9,292,982 B1* | 3/2016 | Higgs .................... G07C 5/008 |
| 9,507,346 B1 | 11/2016 | Levinson et al. |
| 9,541,411 B2 | 1/2017 | Tang et al. |
| 9,696,171 B2 | 7/2017 | Bostick et al. |
| 9,763,055 B2 | 9/2017 | Fan et al. |
| 9,842,437 B2 | 12/2017 | Biemer |
| 9,898,876 B2 | 2/2018 | Hollweg et al. |
| 9,900,747 B1 | 2/2018 | Park |
| 10,072,932 B2 | 9/2018 | Cordova et al. |
| 10,210,679 B1 | 2/2019 | Higgs et al. |
| 10,309,787 B2 | 6/2019 | Strauf et al. |
| 2010/0156711 A1 | 6/2010 | Christensen et al. |
| 2011/0137684 A1 | 6/2011 | Peak et al. |
| 2016/0066155 A1* | 3/2016 | Fan ....................... H04W 4/027 455/457 |
| 2016/0214647 A1* | 7/2016 | Weisswange ....... B60W 30/095 |
| 2017/0099582 A1* | 4/2017 | Boesen ................. H04W 4/029 |
| 2018/0204119 A1 | 7/2018 | Anderson et al. |
| 2018/0342033 A1 | 11/2018 | Kislovskiy et al. |
| 2019/0019256 A1 | 1/2019 | Harish et al. |
| 2019/0086229 A1 | 3/2019 | Chintakindi |
| 2020/0118444 A1 | 4/2020 | Wen et al. |

OTHER PUBLICATIONS

Mileage Made Easy Auto Mileage Tracker Log, automileagelog.net, Jul. 18, 2019, 28 pages.

MileIQ Mileage Tracking App Automatic Smart Mileage Log, https://www.mileiq.com, Jul. 19, 2019, 5 pages.

Jean Wolf et al, Elimination of the Travel Diary, Transportation Research Record 1768 Paper No. 01-3255, Dec. 17, 2001, 10 pages.

Lara Montini et al, Trip Purpose Identification from GPS Tracks, Transportation Research Record 2405, Institute for Transport, Planning and Systems (IVT), Swiss Federal Institute of Technology (ETH), Zurich, Switzerland, Jul. 17, 2014, 8 pages.

Yijing Lu et al, Trip Purpose Estimation for Urban Travel in the U.S.: Model Development, NHTS Add-on Data Analysis, and Model Transferability Across Different States, https://www.semanticscholar.org, 2014, 1 page.

Jan. 15, 2021—(WO) International Search Report & Written Opinion—PCT/US20/056848.

* cited by examiner

SYSTEMS AND METHODS FOR CLASSIFYING VEHICLE TRIPS

FIELD OF USE

Aspects of the invention relate to data processing and more specifically to classifying telematics data.

BACKGROUND

A transportation network company matches passengers with vehicles via websites and mobile apps. Drivers for transportation network companies typically own or lease their own vehicles when driving passengers. Accordingly, drivers can use their vehicle for both business purposes and personal purposes. However, due to the distributed nature of transportation network companies, it is difficult to assess when a specific driver is driving for a transportation network company as compared to personal use. Accordingly, there is a need to accurately determine if a driver is engaged in a trip for business or personal use.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with embodiments of the invention can obtain and use a variety of telematics data to classify trips taken by a vehicle. Trip models can be generated based on telematics data captured during the operation of a vehicle. A variety of features of the trip model, such as the timing and/or location of stops made by the vehicle during one or more trips, can be used to classify the trip as a business trip or a personal trip. In several embodiments, machine classifiers are trained to classify features within the trip models based on historical trips that have been classified as business trips or personal trips. A number of trip models can be combined with other driver attributes to classify a particular vehicle and/or driver as engaged with a transportation network company.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In the following description of the various embodiments, reference is made to the accompanying drawings, which form a part hereof, and in which is shown by way of illustration, various embodiments of the disclosure that can be practiced. It is to be understood that other embodiments can be utilized.

Aspects described herein relate to classifying vehicle trips. Aspects described herein also relate to classifying drivers based on the classified vehicle trips. Trip models can be generated based on telematics data captured during the operation of a vehicle. In several embodiments, the telematics data is captured using a computing device, such as a mobile device or smartphone, associated with a driver of the vehicle. A variety of features of the trip model, such as the timing and/or location of stops made by the vehicle during one or more trips, can be used to classify the trip as a business trip or a personal trip. In several embodiments, machine classifiers are trained to classify features within the trip models based on historical trips that have been classified as business trips or personal trips. A number of trip models can be combined with other driver attributes to classify a particular vehicle and/or driver as engaged with a transportation network company. The classification of drivers can be determined based on the times and/or locations the vehicle and/or driver is typically engaged in activities associated with the transportation network company.

These and various other arrangements will be described more fully herein. As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment, or at least one embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

Operating Environments and Computing Devices

Figure 1:
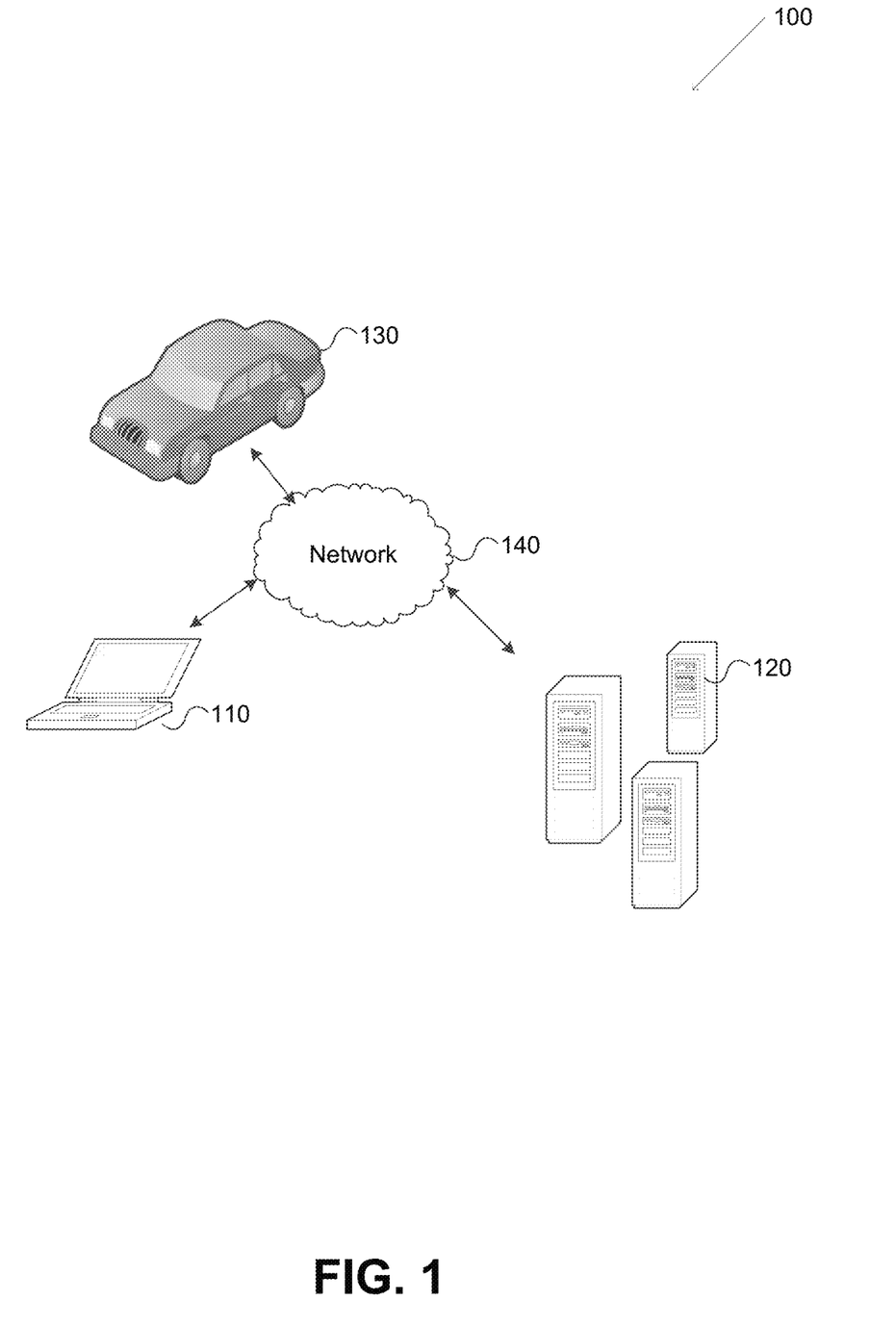
FIG. 1 illustrates an example operating environment in which one or more aspects described herein can be implemented.

FIG. 1 illustrates an operating environment 100 in accordance with at least one embodiment of the invention. The operating environment 100 includes at least one client device 110, at least one classification server system 120, and/or at least one vehicle 130 in communication via a network 140. Any of the devices and systems described herein can be implemented, in whole or in part, using one or more computing devices described with respect to FIG. 2.

Client devices 110 and classification server systems 120 can allow for users to obtain telematics data from vehicles 130, generate trips, and/or classify trips, vehicles, and/or drivers as described herein. The network 140 can include a local area network (LAN), a wide area network (WAN), a wireless telecommunications network, and/or any other communication network or combination thereof.

Vehicle 130 can be, for example, an automobile, motorcycle, scooter, bus, recreational vehicle, boat, or other vehicle for which sensor or crash data can be collected and analyzed. A telematics device within the vehicle 130 can be used to collect and/or receive sensor data and/or to receive sensor data from the vehicle 130. The telematics device can process the data to detect a crash or non-crash event and/or transmit the sensor or crash data to the outcome determination server system 120 or other computing devices. A telematics device can be, for example, mobile phones, personal digital assistants (PDAs), tablet computers, laptop computers, smartwatches, and other devices that can be carried by drivers or passengers inside or outside of the vehicle 130. The telematics device can also be integrated into the vehicle 130 and/or connected to a data bus within the vehicle 130 via a diagnostic connector, such as an OBD-II connector. The telematics device can receive a variety of data, such as acceleration, velocity, location, vehicle operation data such as braking, turning, swerving, and the like from sensors located within the telematics device and/or vehicle. For example, a telematics device having a Global Positioning System (GPS) receiver can determine vehicle location, speed, direction and other basic driving data without needing to communicate with vehicle sensors or external vehicle systems. However, it should be noted that any of a variety of other location determination techniques, such as location determined based on wireless networks to which the mobile device is connected, such as Wi-Fi networks, cellular networks, and the like, can also be used. The sensors of the telematics device, such as a GPS and/or a compass, can sense the speed and/or direction at which the telematics device (and accordingly vehicle 130) is traveling. An accelerometer of the telematics device can sense the acceleration of the mobile device. A gyroscope can be used to determine the orientation of the mobile device. In some aspects, orientation can be detected, for example, at a rate of 90 Hz. The gyroscope can also be used to measure the speed of rotation of the telematics device. A magnetometer can be used to measure the strength and direction of the magnetic field relative to the telematics device. The data collected by the telematics device can be stored and/or analyzed within the telematics device. The processing components of the telematics device can be used to analyze sensor data, determine that a crash has or has not occurred, and confirm whether or not the crash has occurred. Additionally or alternatively, the telematics device can transmit, via a wired or wireless transmission network, the data to one or more computing devices for storage and/or analysis. In a variety of embodiments, the telematics device transmits data when it detects that a crash has occurred.

Vehicle 130 can further include a short-range communication system. The short-range communication systems can be a vehicle-based data transmission systems configured to transmit vehicle operational data to other nearby vehicles, and to receive vehicle operational data from other nearby vehicles. In some examples, communication system can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. Vehicle-to-vehicle (V2V) transmissions between the short-range communication system can be sent via DSRC, Bluetooth, satellite, GSM infrared, IEEE 802.11, WiMAX, RFID, and/or any suitable wireless communication media, standards, and protocols. In certain systems, the short-range communication system can include specialized hardware installed in vehicle 130 (e.g., transceivers, antennas, etc.), while in other examples the short-range communication system can be implemented using existing vehicle hardware components (e.g., radio and satellite equipment, navigation computers) or can be implemented by software running on a telematics device within (or near) the vehicle 130. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, rail road crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from vehicle 130 to any other vehicle or other infrastructure device capable of receiving the communication within the range of the vehicle's transmission capabilities. For example, vehicle 130 can periodically broadcast (e.g., every 0.1 second, every 0.5 seconds, every second, every 5 seconds, dynamically, etc.) certain vehicle operation data via its short-range communication system, regardless of whether or not any other vehicles or reception devices are in range. In other examples, a short-range vehicle communication system can first detect nearby vehicles and receiving devices, and can initialize communication with each by performing a handshaking transaction before beginning to transmit its vehicle operation data to the other vehicles and/or devices. Broadcasts from infrastructure can also have varying ranges and, in some examples, infrastructure can broadcast to an intermediate station which can then relay the information to one or more computing devices.

The types of vehicle operational data, vehicle driving data, breakdown issue data, or the like, transmitted to or from vehicle 130 and/or infrastructure can depend on the protocols and standards used for the V2V or V2I communication, the range of communications, and other factors. In certain examples, vehicle 130 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle 130 is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V (or V2I) communications.

In various other examples, any data collected by any vehicle sensors potentially can be transmitted via V2V or V2I communication to other nearby vehicles or infrastructure devices receiving V2V or V2I communications from a short-range communication system. Further, additional vehicle driving data not from the vehicle's sensors (e.g., vehicle make/model/year information, driver insurance information, driving route information, vehicle maintenance information, driver scores, etc.) can be collected and transmitted using V2V or V2I communications to nearby vehicles and other receiving devices using the short-range communication system.

The data transferred to and from various devices in operating environment 100 can include secure and sensitive data. Therefore, it can be desirable to protect transmissions of such data using secure network protocols and encryption, and also to protect the integrity of the data when stored on the various computing devices within the software deployment system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform, and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. In still other examples, a security and integration layer can include specialized hardware for providing secure web services. For example, secure network appliances can include built-in features such as hardware-accelerated SSL and HTTPS, WS-Security, and/or firewalls. Such specialized hardware can be installed and configured in the operating environment 100 in front of one or more computing devices describe herein such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
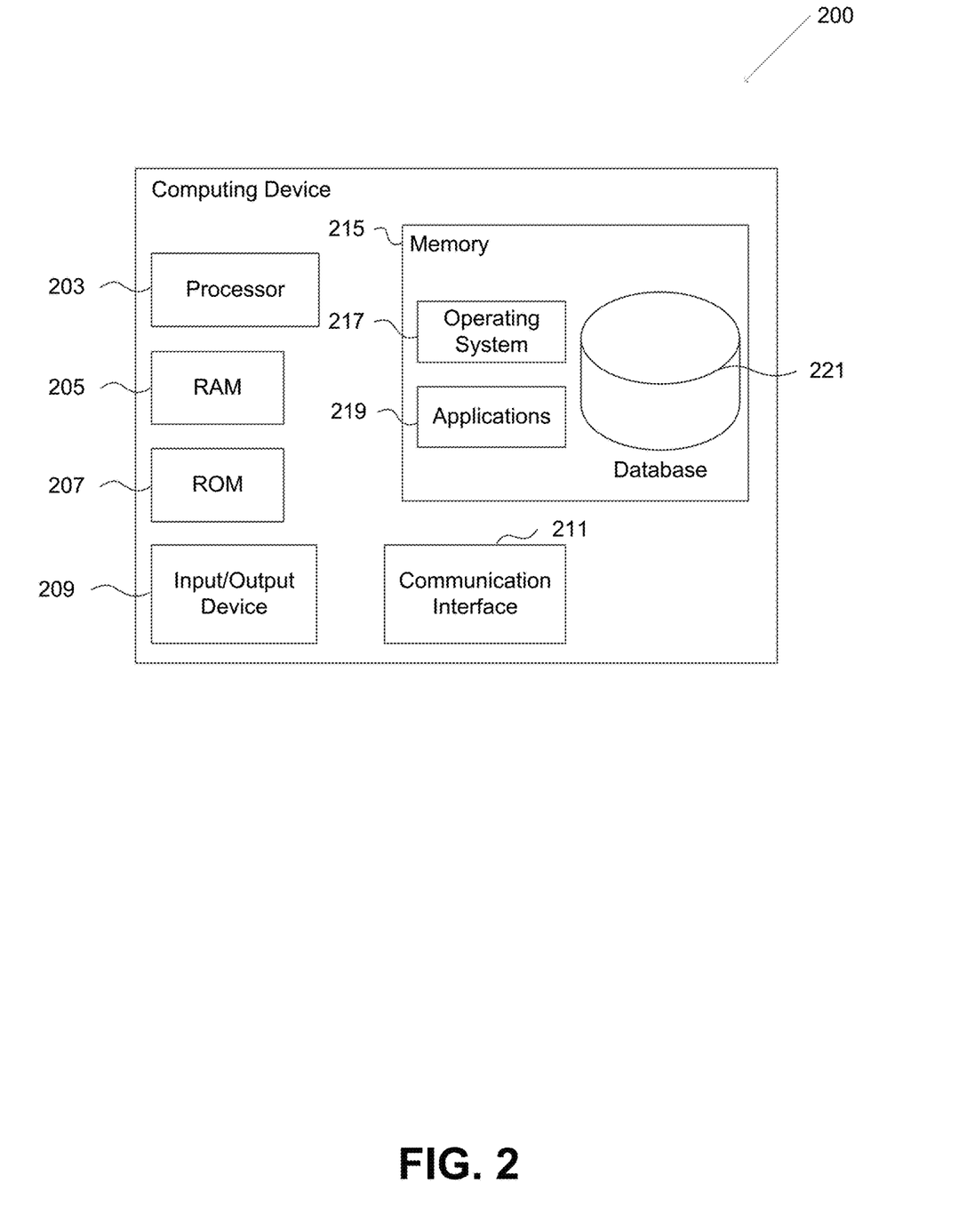
FIG. 2 illustrates one an example computing device in accordance with one or more aspects described herein.

Turning now to FIG. 2, a computing device 200 in accordance with at least one embodiment of the invention is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of software deployment systems, such as faster response times and less dependence on network conditions when transmitting and receiving data.

Although various components of computing device 200 are described separately, functionality of the various components can be combined and/or performed by a single component and/or multiple computing devices in communication without departing from the invention.

Classifying Vehicle Usage

Figure 3:
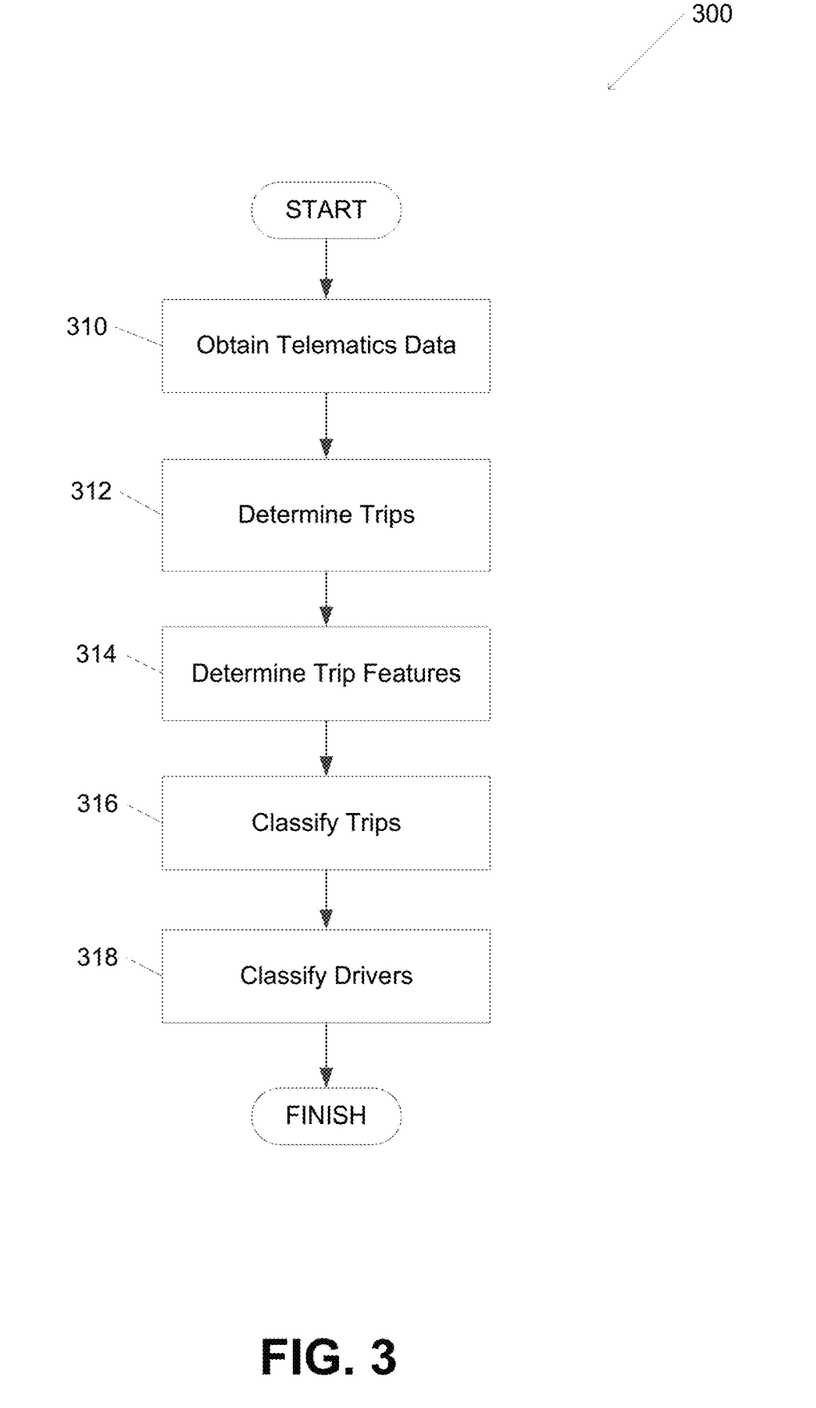
FIG. 3 is a flow chart illustrating a process for classifying vehicle usage of a vehicle in accordance with at least one embodiment of the invention.

FIG. 3 is a flow chart illustrating a process for classifying vehicle usage in accordance with at least one embodiment of the invention. Some or all of the steps of process 300 can be performed using any of the computing devices and/or combination thereof described herein. In a variety of embodiments, some or all of the steps described below can be combined and/or divided into sub-steps as appropriate.

At step 310, telematics data can be obtained. The telematics data can be obtained from a telematics device associated with a vehicle. The telematics device can be installed in the vehicle and/or can be a mobile device associated with one or more persons in the vehicle (e.g., driver, passenger, etc.). The telematics data can include acceleration data, speed data, braking data, heading data, geographic data, impact data, data identifying the vehicle and/or passengers, and/or any other data as appropriate. The obtained telematics data can also include data captured using multiple telematics devices and/or telematics devices associated with other vehicles and/or locations proximate to the vehicle. The telematics data can include a subset and/or an aggregation of raw sensor data captured using the sensors associated with the telematics device. In a variety of embodiments, the telematics data includes a stream of raw sensor data captured using the telematics device.

At step 312, one or more trips can be determined. A trip can be determined based on the locations the vehicle identified in the telematics data visits over a particular time frame. A trip can have a starting location, a starting time, an ending location, and an ending time. A trip can further have a set of intermediate stops, each intermediate stop having a location, an intermediate start time, and an intermediate end time. A trip can further include additional trip locations between the locations and the stops such that the trip locations identify the path taken by the vehicle. The locations, intermediate stops, and/or additional trip locations can include geographic coordinates (such as coordinates generated using a GPS receiver), geographic landmarks, addresses, and/or any other location identifying data as appropriate. The times can include the time of day, a date, and/or a day of the week as appropriate. In a number of embodiments, the geographic coordinates of the trip start and/or trip end can be used to identify the appropriate time zone so that the trip start/end timestamps can be converted to the time corresponding to the physical location of the vehicle during the trip.

At step 314, trip features can be determined. Determined features within a trip can include, but are not limited to, the starting location of the trip, the ending location of the trip, intermediate stops, the acceleration of the vehicle at a particular time, the speed of the vehicle at a particular time, points of interest visited by the vehicle, and the like. In many embodiments, a starting location is determined by identifying when a vehicle begins moving after not being previously classified as being in a trip. In several embodiments, an ending location is determined by identifying when a vehicle stops moving for more than a trip end threshold period of time. In a variety of embodiments, an intermediate stop is identified when a vehicle has been moving and stops at a location for at least intermediate threshold period of time. In several embodiments, the intermediate threshold period of time is less than the trip end threshold period of time. The trip end threshold period of time is typically greater than the intermediate threshold period of time. For example, the trip end threshold can be 20, 25, 30, or the like, minutes, while the intermediate threshold can be 30 seconds, 2 minutes, 5 minutes, or the like. In this way, the ending of a trip can be differentiated from an intermediate stop. It should be noted that the thresholds provided are for example only and any threshold can be used as appropriate. In many embodiments, a point of interest can be a location corresponding to a residential address and/or a business. Points of interest can be determined using a variety of geographic databases mapping geographic coordinates to a particular point of interest and/or address, where the address can be mapped to the point of interest. In this way, the types of locations being visited during the trip can also be identified. In a number of embodiments, determining trip features includes generating a trip model. A trip model can include a set of geographic locations and metadata identifying the features associated with the geographic location. These features can include, but are not limited to, the duration of stops associated with each geographic location as described herein.

At step 316, trips can be classified. Trips can be classified to determine if the trip is a business trip (e.g., the vehicle is being operated in a business capacity and/or a driver of the vehicle is operating the vehicle as part of a transportation network company) and/or a personal trip (e.g., the vehicle is being operated for personal use of the driver). The classification of a trip can include labeling the trip as a business trip and/or a personal trip along with a confidence metric indicating a probabilistic likelihood that the label correctly identifies the class of the trip. The trip can be classified based on the features present within the trip model. The features can be classified according to a variety of criteria including, but not limited to, trip duration, a trip driven distance, and/or a ratio of the trip driven distance to the ideal distance driven between the starting point and the ending point of the trip, also known as the ideal-driven distance ratio. In several embodiments, the ideal distance driven between the starting point and the ending point can be determined by generating a suggested route between the starting point and the ending point using a mapping database including known paths (e.g. roadways) between geographic locations. In a variety of embodiments, the ideal distance driven is the geodesic distance between the starting location and the ending location. For example, a trip with several short intermediate stops and a route significantly longer than the ideal route is likely to be labeled as a business trip, while a trip with a single intermediate stop and a distance approximately as long as the ideal distance is likely to be labeled as a personal trip. The labels can be any data identifying the output of the trip, such as a text label and/or a score. In a number of embodiments, trips are scored on a scale from zero to one, where zero is a trip that is definitely a personal trip and a one is a trip that is definitely a business trip. A score threshold can be used to determine if a trip if a personal trip or a business trip. Returning to the previous example, a trip can be labeled as a personal trip if the score is less than 0.5, while the trip can be labeled as a business trip if the score is greater than 0.5. In a variety of embodiments, the score for a trip is based on the probabilistic likelihood that the generated label for a trip is correct.

Trips can also be classified based on groupings of trips taken within a particular time frame. The time frame can be any arbitrary time frame, such as 5 minutes, 10 minutes, and/or 15 minutes. Groups of trips can be classified based on overall duration, overall distance driven, overall ideal-to-driven distance ratio, the minimum trip length in the group of trips, the maximum trip length in the group of trips, the average trip length for the group of trips, the minimum trip distance in the group of trips, the maximum trip distance in the group of trips, the average trip distance for the group of trips, the minimum ideal-to-driven distance ratio for the group of trips, the maximum ideal-to-driven distance ratio for the group of trips, and/or the average ideal-to-driven distance ratio for the group of trips. The duration of a group of trips can be determined based on the earliest starting time and the latest ending time for the trips in the group of trips. The overall ideal-to-driven distance ratio can be determined based on the total distance driven for each trip in the group of trips and the ideal trip between the earliest starting point and the latest ending point for the group of trips. The classification of trips can be based on multiple groupings of trips and each trip can be included in multiple groups.

In several embodiments, the trip labels and/or probabilistic likelihood can be calculated using one or more machine classifiers. A variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions. A machine classifier can be trained based on historical trip data and ground truth labels indicating if each trip is a business trip and/or a personal trip. A variety of additional data, such as the telematics data, can also be included in the training of the machine classifier. In several embodiments, training the machine classifier includes automatically updating one or more weights associated with neurons within one or more layers of a machine learning model utilized by the machine classifier to generate probabilistic likelihoods of particular trips being associated with a particular label. In many embodiments, the machine classifier can be retrained using the classified trips. In this way, the ability of the machine classifier can be continuously improved based on newly obtained telematics data.

At step 318, drivers can be classified. The classified trips can be used to determine if the vehicle and/or driver is associated with services provided by a transportation network company. The classified results can also indicate at what times of day and/or what days of the week the vehicle and/or driver is engaged in driving associated with business trips and/or personal trips. A variety of processes for classifying drivers based on the classified trips are described in more detail with respect to FIG. 4.

Figure 4:
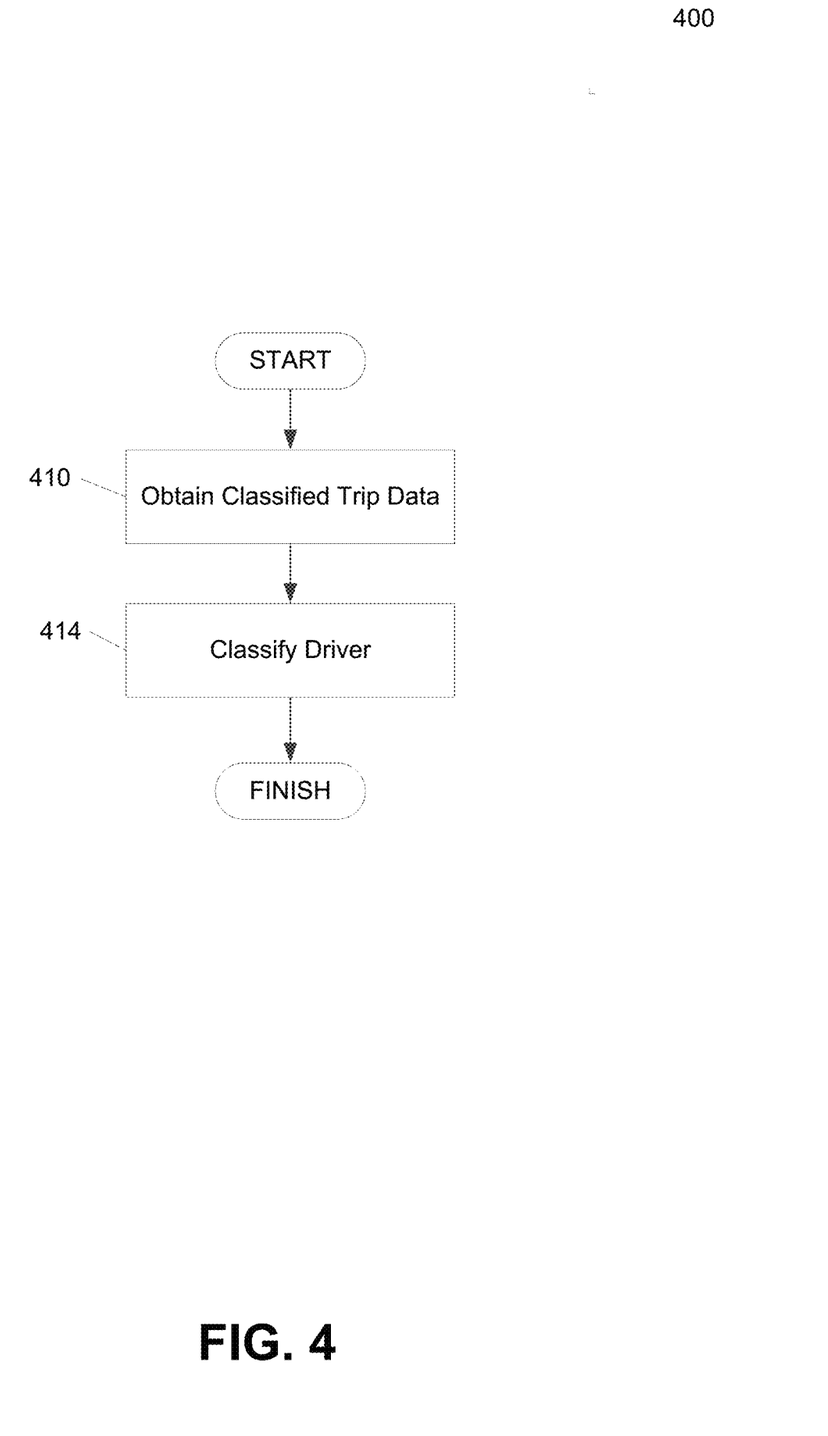
FIG. 4 is a flow chart illustrating a process for classifying drivers in accordance with at least one embodiment of the invention.

FIG. 4 is a flow chart illustrating a process for classifying drivers in accordance with at least one embodiment of the invention. Some or all of the steps of process 400 can be performed using any of the computing devices and/or combination thereof described herein. In a variety of embodiments, some or all of the steps described below can be combined and/or divided into sub-steps as appropriate.

At step 410, classified trip data can be obtained. The classified trip data can include a set of trips, labels indicating if a particular trip is a business trip and/or a personal trip, and/or a probabilistic likelihood that the label associated with the trip is correct as described herein.

At step 414, a driver can be classified. Drivers can be classified to determine if the driver is primarily driving for business trips or for personal trips. The driver can be classified based on the number of trips of a particular type are taken. The driver's classification can be based on the overall nature of the trips taken by the driver and/or the types of trips taken by the driver at particular days and/or times. For example, a driver can regularly drive for a transportation network company on Friday and Saturday nights, while driving for personal reasons at other times.

Classifying drivers can be useful in a variety of contexts, such as determining when a vehicle should be insured as a commercial vehicle rather than a personal vehicle. In several embodiments, multiple insurance policies can be issued for a single vehicle depending on the time of day the vehicle is being driven. In this way, a vehicle can be insured as a commercial vehicle when it is typically engaged in business trips and as a personal vehicle when it is typically engaged in personal trips. Likewise, drivers can also be classified as engaged in business trips or personal trips independently of the vehicle being driven. In this way, drivers that use a variety of vehicles to provide commercial services for a transportation network company can be tracked and properly insured. For example, drivers that rent a vehicle (rather than owning a single vehicle) for engaging in business trips on a particular day can be identified. This information can be used, for example, to adjust the rate changed to the driver for renting a car and/or suggesting appropriate insurance coverages to the driver to cover them in both their personal and business driving.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules can be written in a source code programming language that is subsequently compiled for execution, or can be written in a scripting language such as (but not limited to) HTML or XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied in whole or in part in firmware or hardware equivalents such as integrated circuits, field programmable gate arrays (FPGA), and the like. Particular data structures can be used to more effectively implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
    obtaining, by a classification server system, telematics data comprising a set of geographic locations and a set of times that a vehicle was at each geographic location;
    determining, by the classification server system, a set of trips based on the telematics data, wherein:
        each trip in the set of trips comprises a starting location, a starting time the vehicle was at the starting location, an ending location, and an ending time the vehicle was at the ending location; and
        the starting location and the ending location are indicated in the set of geographic locations;
    determining, by the classification server system, a set of features for each trip in the set of trips; and
    classifying, by the classification server system, each trip in the set of trips based on the set of features for each trip, wherein a classified trip comprises the set of features, a label indicating if the trip is a business trip or a personal trip, and a confidence metric indicating a probabilistic likelihood that the label correctly identifies a class of trip, wherein the business trip is defined as the vehicle being operated in a business capacity as part of a transportation network company and the personal trip is defined as the vehicle being operated for personal use.

2. The method of claim 1, wherein the telematics data is obtained from a mobile device associated with a driver of the vehicle.

3. The method of claim 1, wherein:
    the telematics data further comprises a driver identifier; and
    the method further comprising classifying, by the classification server system, a driver as a commercial driver or a personal driver based on the classified trips.

4. The method of claim 1, wherein the set of features for a trip comprises at least one intermediate stop at a point of interest visited by the vehicle.

5. The method of claim 4, further comprising:
    determining, by the classification server system, the ending location of a trip in the set of trips based on an ending threshold time; and
    determining, by the classification server system, the at least one intermediate stop based on an intermediate threshold time, wherein the intermediate threshold time is less than the ending threshold time.

6. The method of claim 1, further comprising classifying a trip in the set of trips by:
    calculating, by the classification server system, a total trip duration based on the starting time and the ending time;
    calculating, by the classification server system, a trip driven distance based on a distance between each geographic location in the trip;
    calculating, by the classification server system, a ratio of the trip driven distance to an ideal distance driven between the starting location and the ending location of the trip; and
    generating, by the classification server system, the label based on the total trip duration, the trip driven distance, and the ratio of the trip driven distance to the ideal distance driven between the starting location and the ending location.

7. The method of claim 1, further comprising:
    classifying each trip using a machine classifier; and
    retraining, by the classification server system, the machine classifier based on the classified trips.

8. A computing device, comprising:
    one or more processors; and
    memory storing instructions that, when executed by the one or more processors, cause the computing device to:
    obtain telematics data comprising a set of geographic locations and a set of times that a vehicle was at each geographic location;
    determine a set of trips based on the telematics data, wherein:
        each trip in the set of trips comprises a starting location, a starting time the vehicle was at the starting location, an ending location, and an ending time the vehicle was at the ending location; and
        the starting location and the ending location are indicated in the set of geographic locations;
    determine a set of features for each trip in the set of trips; and
    classify each trip in the set of trips based on the set of features for each trip, wherein a classified trip comprises the set of features, a label indicating if the trip is a business trip or a personal trip, and a confidence metric indicating a probabilistic likelihood that the label correctly identifies a class of trip, wherein the business trip is defined as the vehicle being operated in a business capacity as part of a transportation network company and the personal trip is defined as the vehicle being operated for personal use.

9. The computing device of claim 8, wherein the instructions, when executed by the one or more processors, further cause the computing device to obtain the telematics data from a mobile device associated with a driver of the vehicle.

10. The computing device of claim 8, wherein:
    the telematics data further comprises a driver identifier; and
    the instructions, when executed by the one or more processors, further cause the computing device to classify a driver as a commercial driver or a personal driver based on the classified trips.

11. The computing device of claim 8, wherein the set of features for a trip comprises at least one intermediate stop at a point of interest visited by the vehicle.

12. The computing device of claim 11, wherein the instructions, when executed by the one or more processors, further cause the computing device to:
    determine the ending location of a trip in the set of trips based on an ending threshold time; and determine the at least one intermediate stop based on an intermediate threshold time, wherein the intermediate threshold time is less than the ending threshold time.

13. The computing device of claim 8, wherein the instructions, when executed by the one or more processors, further cause the computing device to classify a trip in the set of trips by:
   calculating a total trip duration based on the starting time and the ending time;
   calculating a trip driven distance based on a distance between each geographic location in the trip;
   calculating a ratio of the trip driven distance to an ideal distance driven between the starting location and the ending location of the trip; and
   generating the label based on the total trip duration, the trip driven distance, and the ratio of the trip driven distance to the ideal distance driven between the starting location and the ending location.

14. The computing device of claim 8, wherein the instructions, when executed by the one or more processors, further cause the computing device to:
   classify each trip using a machine classifier; and
   retrain the machine classifier based on the classified trips.

15. A non-transitory machine-readable medium storing instructions that, when executed by one or more processors, cause the one or more processors to perform steps comprising:
   obtaining telematics data comprising a set of geographic locations and a set of times that a vehicle was at each geographic location;
   determining a set of trips based on the telematics data, wherein:
      each trip in the set of trips comprises a starting location, a starting time the vehicle was at the starting location, an ending location, and an ending time the vehicle was at the ending location; and
      the starting location and the ending location are indicated in the set of geographic locations;
   determining a set of features for each trip in the set of trips; and
   classifying each trip in the set of trips based on the set of features for each trip, wherein a classified trip comprises the set of features, a label indicating if the trip is a business trip or a personal trip, and a confidence metric indicating a probabilistic likelihood that the label correctly identifies a class of, wherein the business trip is defined as the vehicle being operated in a business capacity as part of a transportation network company and the personal trip is defined as the vehicle being operated for personal use.

16. The non-transitory machine-readable medium of claim 15, wherein the instructions, when executed by one or more processors, further cause the one or more processors to perform steps comprising obtaining the telematics data from a mobile device associated with a driver of the vehicle.

17. The non-transitory machine-readable medium of claim 15, wherein the instructions, when executed by one or more processors, further cause the one or more processors to perform steps comprising classifying a driver as a commercial driver or a personal driver based on the classified trips, wherein the driver is indicated in the telematics data.

18. The non-transitory machine-readable medium of claim 15, wherein the set of features for a trip comprises at least one intermediate stop at a point of interest visited by the vehicle.

19. The non-transitory machine-readable medium of claim 18, wherein the instructions, when executed by one or more processors, further cause the one or more processors to perform steps comprising:
   determining the ending location of a trip in the set of trips based on an ending threshold time; and
   determining the at least one intermediate stop based on an intermediate threshold time, wherein the intermediate threshold time is less than the ending threshold time.

20. The non-transitory machine-readable medium of claim 15, wherein the instructions, when executed by one or more processors, further cause the one or more processors to classify a trip in the set of trips by:
   calculating a total trip duration based on the starting time and the ending time;
   calculating a trip driven distance based on a distance between each geographic location in the trip;
   calculating a ratio of the trip driven distance to an ideal distance driven between the starting location and the ending location of the trip; and
   generating the label based on the total trip duration, the trip driven distance, and the ratio of the trip driven distance to the ideal distance driven between the starting location and the ending location.

\* \* \* \* \*